United States Patent [19]

Morin

[11] Patent Number: 4,491,058
[45] Date of Patent: Jan. 1, 1985

[54] STOP KEY FOR THE VALVE PLUNGER OF A POWER BRAKE SERVOMOTOR

[75] Inventor: Gérard Morin, Conde Ste Libiaire, France

[73] Assignee: Societe Anonyme DBA, Paris, France

[21] Appl. No.: 521,792

[22] Filed: Aug. 9, 1983

[30] Foreign Application Priority Data

Aug. 20, 1982 [FR] France .................................. 82 14388

[51] Int. Cl.³ .................................................. F15B 9/10
[52] U.S. Cl. .............................. 91/376 R; 91/369 A; 60/554
[58] Field of Search ............ 91/369 A, 369 B, 369 R, 91/376 R; 60/554, 547.1

[56] References Cited

U.S. PATENT DOCUMENTS

| | | | |
|---|---|---|---|
| 3,688,647 | 9/1972 | Kytta | 91/369 A |
| 4,043,251 | 8/1977 | Ohmi | 91/369 B |
| 4,283,992 | 8/1981 | Wilson | 91/369 B |
| 4,406,213 | 9/1983 | Haar | 91/369 A |
| 4,416,188 | 11/1983 | Katagiri et al. | 91/369 B |

FOREIGN PATENT DOCUMENTS

| | | |
|---|---|---|
| 3113271 | 10/1982 | Fed. Rep. of Germany . |
| 2051722 | 4/1971 | France . |
| 2421773 | 11/1979 | France . |
| 2456021 | 12/1980 | France . |
| 2472095 | 6/1981 | France . |
| 152654 | 11/1980 | Japan .................. 91/369 A |
| 964289 | 7/1964 | United Kingdom ............ 91/369 A |
| 2076488 | 12/1981 | United Kingdom . |
| 2078885 | 1/1982 | United Kingdom . |

Primary Examiner—Paul E. Maslousky
Attorney, Agent, or Firm—Larry J. Palguta; Ken C. Decker

[57] ABSTRACT

The stop key (60) for the plunger (50) of the valve means (30) of the servomotor (10) is mounted without play in a radial recess of the hub (19) of the working piston (20), the key having a flat body portion and two angularly folded lateral edges, the recess having a constant axial dimension essentially identical to the overall thickness of the key.

10 Claims, 6 Drawing Figures

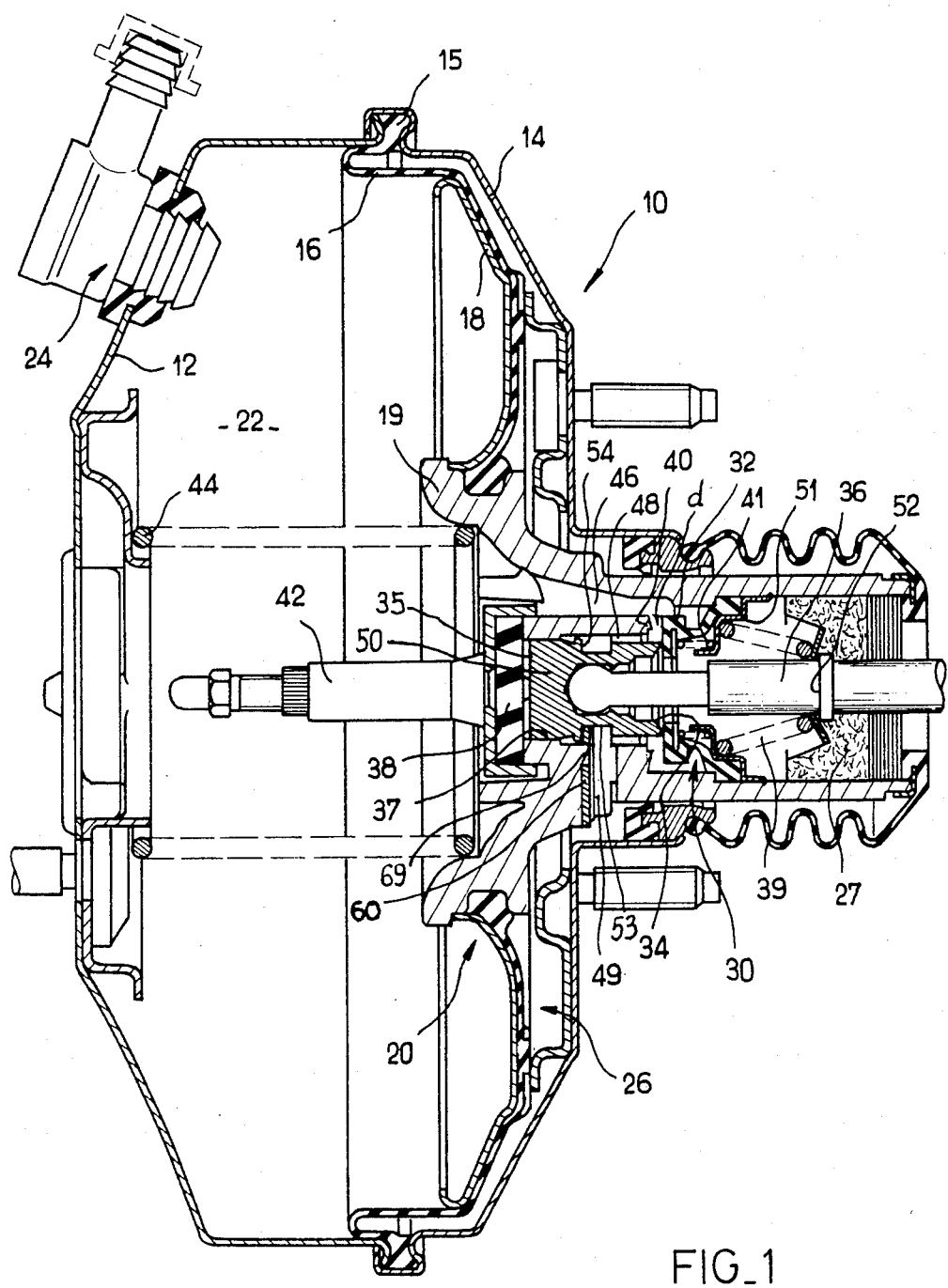
FIG_1

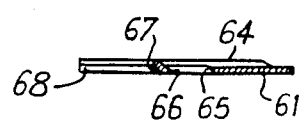
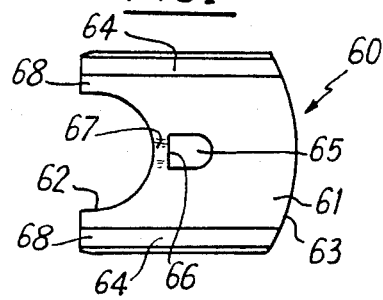
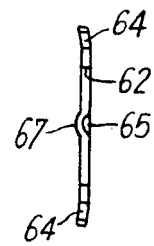
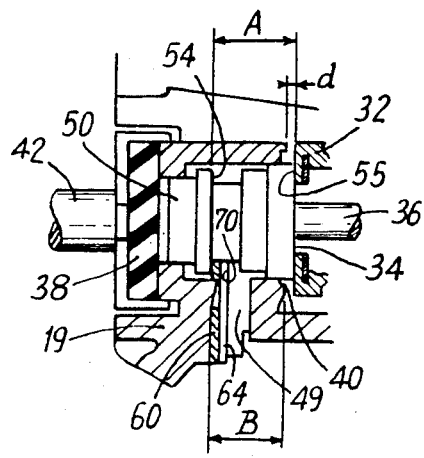
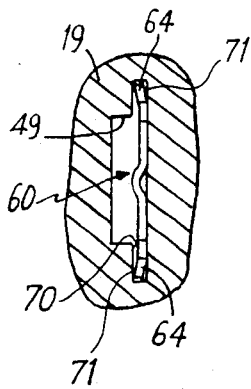

STOP KEY FOR THE VALVE PLUNGER OF A POWER BRAKE SERVOMOTOR

The present invention concerns servomotors for braking assistance and, more particularly, the abutment means or stop keys for the sliding valve plunger forming a mobile seat for the distribution valve of the servomotor, actuated by the brake pedal, conventionally via an actuating rod.

A conventional servomotor for brake assistance, more particularly of the vacuum type, incorporates in an airtight casing, two chambers separated from one another by a working diaphragm piston capable of actuating a brake master cylinder, while being displaced from a rest position, the working piston incorporating a three-way valve means capable of being actuated by an axial control rod joined mechanically to the brake pedal. The first of these chambers is intended to be connected to a vacuum source available on the vehicle, for example a depression existing in the inlet manifold of the engine, the part played by the three-port valve means consisting of putting the second chamber selectively in communication with the first vacuum chamber or with the atmosphere. The valve means typically consists of an axially mobile annular flap component capable of coming to bear in turn against a mobile seat, formed at the end of a plunger firmly fixed to the control rod, and against an annular seat formed around the mobile seat by the working piston hub in which the plunger slides axially. In the rest position of the valve means, the annular flap component is normally retained bearing elastically against the mobile seat, in a configuration establishing communiction between the two chambers of the casing. On the other hand, the axial displacement of the control rod causes the mobile seat to shift away from the rest position, so that the annular flap component then comes to bear against the annular seat of the hub, the effect of which is to isolate the two chambers from one another and to put the second chamber in communication with the atmosphere. The difference in pressure thus created on either side of the working piston causes the displacement of the latter for the actuation of the brake master cylinder.

In such an arrangement of assistance servomotor, the valve plunger, which slides in a bore in a hub of the working piston and which generally forms a thrust component acting directly on the reaction washer to ensure the operation of the device in the event of failure of the pneumatic system, must be retained with an axial play in the piston hub. In particular, its return travel—towards the rest position—must be limited by a stop component in order to fix as precisely as possible the lost travel of the valve means at its opening, that is to say at the start of a braking phase. This lost travel is physically represented by the axial distance separating—at rest—the mobile flap component from the annular seat of the hub of the working piston. Now, the rest position of the mobile flap valve is determined by the mobile seat against which it is normally elastically held. It is thus imperative to fix the limit position for the plunger return with the greatest precision in order to reduce effectively the lost travel of the servomotor actuation while maintaining a sufficient flap lift between the flap component and the annular seat whose rest position is determined for the return by the piston/diaphragm assembly coming into abutment against the rear face of the servomotor casing.

The rest position of the plunger is conventionally determined by a stop component positioned in the working piston hub and against which, for the return, a peripheral surface of the plunger comes to bear. Originally, this stop component was inserted into a radial slot in the thickened inner part of the hub and retained in the latter by the inner flange of the diaphragm firmly fixed to the said hub. The need for manufacturers to arrange more compact servomotor/master cylinder assemblies has brought about providing the maximum clearance inside the servomotor casing, notably in order to contain increasingly greater lengths of the master cylinder, and thus to offset the valve means towards the rear, in the region of the central portion of the rear wall of the casing, the working piston hub extending largely as a projection towards the rear of the servomotor, which has brought about arranging the stop component in a floating mounting in a radial opening in this tubular projecting portion of the working piston hub.

This general arrangement has the disadvantage that it presents problems as regards retaining the abutment component (in this case called "stop key") and precisely fixing the reference abutment plane which this stop key must constitute for the plunger.

British Patent Application No. 2,078,885 thus describes such a floating arrangement of the stop key in the working piston hub, the key being retained in position in a radial opening of the latter by a garter spring, the reduction of the lost travel of actuation of the servomotor being obtained at the cost of fairly complex additional means.

Also British Patent Application No. 2,076,488 describes various embodiments for firmly fixing externally to the working piston hub at least one abutment component or plunger stop component positioned in a radial slot in the hub, without guaranteeing, nevertheless, that the (front) abutment face of this component is actually retained in face contact against the adjacent face—able to serve as a reference face—of the radial slot into which the abutment component is entered.

Now, as mentioned above, it is essential that the abutment component is mounted in position in the hub in such a way that it offers internally (in the region of the zone of co-operation in abutment with the plunger) an extremely small axial plane, nil if possible, relative to the hub so that the lost travel may be reduced and determined in a precise manner as a function only of the tolerances of the components constituting the valve means.

French Patent Application No. 2,051,722 describes a mounting in which the stop key in the shape of a U is held in an external recess in the working piston, which consists, however, in the said document, of an assembly of two portions held together with tie rods, according to a complex arrangement requiring delicate setting up.

The aim of the present invention is to propose a simple arrangement, of low manufacturing cost, of a stop key and of a servomotor arranged to admit this key, enabling simple, rapid and precise mounting of the key and allowing a significant reduction of the lost travel of actuation of the servomotor.

To achieve this, according to a characteristic of the invention, the stop key for the valve plunger of a servomotor for assisting with braking, of the type intended to be arranged in a radial housing of the hub of the working piston of the servomotor so as to cooperate in abutment with a shoulder of a valve plunger of the servomotor sliding inside the said hub, consists of a plate component incorporating a flat body portion for mounting and a profiled end forming an abutment for the said shoulder, and two lateral edges folded for mounting it without play in the said housing.

According to another characteristic of the invention, the servomotor for assisting with braking, intended to be provided with such a stop key, and consisting of first and second chambers separated by a working piston for actuating a master cylinder for actuating the brakes, the working piston enclosing a three-port valve means capable of being actuated by a control rod so as to put the second chamber selectively in communication with the atmosphere or with the first chamber, the valve means consisting of an axially mobile annular flap component capable of coming to bear in turn against a mobile seat, formed by a plunger firmly fixed to the control rod, and against an annular seat formed by the hub of the piston motor in which the plunger slides axially, the plunger incorporating a cylindrical portion of reduced diameter defining at least one annular shoulder directed towards the flap component, the hub incorporating, in the region of the said portion of the plunger of reduced diameter, a radial housing intended to admit the stop key so that it co-operates selectively in abutment with the shoulder during the return of the valve means towards its rest position, is characterized in that the housing incorporates a radial opening of rectangular cross-section of a constant axial dimension essentially identical to the overall thickness of the key.

According to another particular characteristic of the invention, an axial wall of the opening has a projecting portion extending axially in this opening so as to enter and become locked in an opening formed in the body portion of the key.

Mounting the key in the hub without axial play and keeping it locked in this configuration by a simple radial insertion with a close fit into the hub opening thus enables the axial distance between the closure face of the annular flap component and the reference plane of the return abutment of the plunger shoulder to be defined with great precision, that is to say to reduce, as a function of the precision of the manufacturing tolerances of the hub and of the plunger, the lost travel of actuation of the servomotor.

Other characteristics and advantages of the present invention will emerge from the following description of an embodiment, given by way of illustration but not in any way limiting, with reference to the accompanying drawings, in which:

FIG. 1 is a diagrammatic longitudinal section of an assistance servomotor according to the invention;

FIGS. 2 to 4 are respectively a plan view, side view and front view of a stop key according to the invention;

FIG. 5 is a partial section showing the arrangement of the stop key in the radial opening in the hub of the piston motor; and FIG. 6 shows diagrammatically the principal axial dimensions of the valve means of the servomotor shown in FIG. 1, shown in the rest position.

As shown in FIG. 1, the servomotor for assisting with braking consists, conventionally, of a casing 10 formed of two shells 12 and 14 held together peripherally so as to trap the outer flange 15 of a flexible diaphragm 16 forming, together with a rigid plate 18 and a tubular hub 19, a working piston assembly 20. In this way, the working piston 20 divides the casing 10 into two chambers, respectively a first chamber or low pressure chamber 22, intended to be permanently connected to a vacuum source through a connecting ferrule 24, and a second chamber or high pressure chamber 26 capable of being selectively put in communication either with the first chamber 22, or with the atmosphere via a filter pad 27 arranged in the hub 19. The tubular rear projecting portion of the hub 19 encloses a valve means with three ports 30 consisting of a mobile annular flap 32, made of elastomeric material, capable of coming to bear in turn axially, on the one hand against a mobile annular seat 34 formed at the rear end of a plunger 50 firmly fixed to the inlet control rod 36 of the servomotor, intended to be connected to the pedal for actuating the vehicle brake (not shown) and, on the other hand, against an annular seat 40 defined centrally in the hub 19 surrounding the mobile seat 34. The hub 19 incorporates an axial bore 37 forming a sliding axial bearing for the plunger 50 which terminates, opposite the mobile seat 34, in a frontal bearing surface 35 intended to enter into engagement with a reaction device 38 consisting of a disc of elastomeric material. The opposite face of the reaction disc 38 co-operates with a push-rod 42 intended to be connected to a brake master cylinder (not shown) for the actuation of the pistons of the latter. A spring 44 bears against an annular reinforcement of the front shell 12 of the casing so as to push the working piston 20 towards the rear, to its rest position shown in FIG. 1, bearing for example against the rear shell 14. When the servomotor is in this rest position, the front bearing face 55 of the mobile flap component 32 is clear of the annular seat 40 by a distance d so as to enable the two chambers 22 and 26 to communicate with one another through internal passages, such as 46, 48 and 49, formed in the hub 19. More precisely, the longitudinal passages 46 allow communication between the first chamber 22 and the opening of the annular seat 40 whereas the internal longitudinal passages 48 and radial passages 49 allow communication between the second chamber 26 and the opening of the annular seat 40. In the rest position shown, the two chambers 22 and 26 communicate with one another and are thus both in depression, owing to the fact that the flap component 32 is bearing and forming a seal against the seat 34 of the plunger 50 under the action of the difference in pressure, of the rod return spring 39 and of the spring 41 pushing the flap. The return spring 39 is mounted in compression between a bearing collar 51 retaining in place the annular base of the flap component 32 and a shoulder 52 of the control rod in such a way that the mobile seat 34 is normally pushed towards the flap component 32 which is itself pushed axially, in the opposite direction, by the spring 41 also bearing on the collar 51.

The rest position of the plunger 50, shown in FIG. 1 is determined by an annular shoulder 54 of the plunger coming into abutment against a stop key 60 in accordance with the invention, mounted in a radial opening 70 of the hub, communicating with the radial window passage 49 (FIG. 5).

The stop key 60, made by punching and bending a metal plate, incorporates a flat body portion 61 cut out at one end to form a semi-circular hollow 62 of a diameter corresponding essentially to the outside diameter of a middle portion 53 of reduced diameter of the plunger (in this case a groove) forming, at its front end, the annular abutment shoulder 54 of the plunger 50. The indentation 62 thus forms two lateral feet 68 surrounding the portion of reduced diameter 53 so as to increase the surface of abutment with the shoulder 54. The opposite end of the body portion 61 has a rounded profile 63 of a radius corresponding essentially to the outside radius of the hub 19 in the region of the opening 70. In accordance with the invention, the opening 70 (FIG. 5) has side portions 71 and a transverse rectangular cross-section of generally constant axial dimension, the front face of this opening being advantageously provided with a projection 69 with a ramp profile (FIG. 1) extending slightly axially in the opening 70 towards the rear of the hub. The two lateral edges (64) of the stop key 60 are slightly folded angularly in the same direction, as may be seen clearly in FIG. 4, these folded edges also affecting the lateral feet 68 of the key. In addition, the body portion 61 incorporates centrally, slightly below the bottom of the indentation 62, a through-opening 65 forming a straight upper stop edge 66. As may be seen in FIG. 4, the key thus has a perfectly flat face forming the abutment plane for the shoulder 54 and held in face contact against the adjacent face of the opening 70 in which the key is gently force-fitted, the axial width of the side portions 71 of opening 70 being constant generally and essentially identical to the normal overall thickness of the key whose folded feet 64 form bearers on the lateral portion of the rear axial face of the opening 70. When the key 60 is inserted radially into the opening 70, the projection 69 enters the opening 65 and, by the abutment of its upper edge against the edge 66 of the opening 65, prevents accidental unhooking of the key, under the effect of vibration, for example. To facilitate the insertion of the key, the bottom of the indentation 62 may incorporate a portion 67 pressed axially in the axial direction of the axially folded lateral edges 64 so as to assist the passage of the bridge projection 69 into opening 65 located between the indentation 62 and rounded profile 63.

As may be seen in FIG. 6, the key 60 being mounted in the opening 70 without play, the dimension B between the front reference face of the key 60 (against which the shoulder 54 comes into abutment) and the annular seat 40 may be compared with the dimension A between the shoulder 54 and rear face 34 forming the seat for the flap of the plunger 50 so as to determine the lost travel d whose value may thus be reduced to a range of between 0.7 and 0.95 mm for example. The hub 19 of the working piston 20 is generally made of rigid plastic, typically of Bakelite. The stop key 60 is typically made from a 1 mm thick steel sheet treated to 340 to 410 VH and oiled. The key then has an overall thickness, including the lateral edges, of 1.5 mm. The thickness of the sheet may be reduced, the rigidity of the key then being provided by ribs or bosses projecting on the same side as the extension of the folded edges.

I claim:

1. A stop key for a valve plunger of a brake servomotor, of the type intended to be arranged in a radial recess of a hub of a working piston of the servomotor so as to cooperate in contact engagement with a shoulder of said valve plunger sliding inside said hub, said stop key consisting of a plate component having a contoured end forming an abutment surface for said shoulder of said valve plunger, characterized in that said stop key comprises a substantially flat body portion coplanar with said abutment surface and having two parallel lateral edges folded for mounting the key securely without movement in said recess, said flat body portion formed, adjacent said contoured end, with an opening for receiving a hub axial projection in said recess.

2. A key according to claim 1, characterized in that said contoured end has a semi-circular cut-out formed in the body portion and defining two lateral end tabs.

3. A key according to claim 1, characterized in that said body portion incorporates a ramp guiding surface for the projection and disposed between the cut-out and said opening.

4. A servo-motor according to claim 1, wherein said opening comprises a through opening for receiving therein said hub axial projection.

5. A braking assistance servomotor intended to be provided with a stop key according to claim 3, comprising first and second chambers separated by said working piston for actuating a brake master cylinder, said working piston hub enclosing three-port valve means capable of being actuated by an input control rod to selectively place the second chamber in communiction with the first chamber or with atmosphere, the three-port valve means comprising an axially movable annular valve member adapted to selectivey engage with a movable seat formed by a valve plunger connected to the input control rod and with an annular seat formed by said hub of said working piston, said valve plunger incorporating a cylindrical portion of reduced diameter defining at least one radial shoulder directed toward said valve member, said hub incorporating, in the vicinity of said cylindrical portion, said radial recess intended to receive said stop key so that the key cooperates selectively in abutment with said shoulder when said three-port valve means is returned toward a rest position, characterized in that said radial recess comprises a radial opening having parallel radially extending side portions having a common axial wall and a constant axial dimension essentially identical to the overall thickness of the key as defined between the abutment surface and free ends of said folded lateral edges.

6. A servomotor according to claim 5, characterized in that said axial wall of said radial opening extends between said portions and includes said axial projection extending axially in the radial opening.

7. A servomotor according to claim 6, characterized in that the axial projection is formed in the axial wall of the radial opening and disposed opposite said valve member.

8. A servomotor according to claim 7, characterized in that said radial opening is prolongated on a side axially opposite said axial projection, by means of a radially extending window forming a passage for fluid flow between the second chamber and the valve means.

9. In a braking assistance pneumatic servomotor including piston means having a hub portion and operated by valve means arranged in said hub portion and including an axially sliding valve plunger coupled to an input control rod of said servomotor, a stop key for limiting axial displacement of said valve plunger and comprising a substantially flat web portion having a flat first surface and prolongated laterally by two parallel folded edges extending angularly with respect to said web portion in a direction away from said first surface, said web portion having a contoured end between adjacent end portions of said folded edges and providing an abutment surface for said valve plunger, said stop key being forcingly fitted by means of the folded edges within a radial recess formed in the hub portion, the radial recess having an essentially flat, radially extending axial end face, whereby said first surface of said stop key bears in engagement with said axial end face of said recess, and complementary shaped, cooperating radial retaining means are provided for positive engagement between said axial end face and flat web portion of said stop key.

10. In the servomotor of claim 9, wherein said radial recess forms a fluid flow passage toward said valve means.

* * * * *